United States Patent Office 2,891,070
Patented June 16, 1959

2,891,070

ADDITION COMPOUNDS OF TRISUBSTITUTED PYRAZOLONE ALDEHYDES WITH PHENOLIC ACID COMPOUNDS

Jules Henri Théophile Ledrut, Saint-Gilles, Belgium, assignor to Egema S.A.R.L., Paris, France, a corporation of France No Drawing. Application January 17, 1957
Serial No. 634,620

Claims priority, application Belgium January 25, 1956

11 Claims. (Cl. 260—311)

The present invention relates to new chemical compounds constituted by equimolecular addition compounds of aldehydic derivatives of trisubstituted pyrazolones and of phenolic acids or of derivatives of these acids, as well as to processes for the preparation of these new compounds.

The aldehydic derivatives of trisubstituted pyrazolones contained in the equimolecular addition compounds according to the invention comprise, on the one hand, the aldehyde of antipyrine of formyl-4-antipyrine or 1-phenyl-2,3-dimethyl-4-formyl-5-pyrazolone of the following formula:

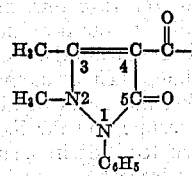

(I)

and on the other hand, the aldehyde of isoantipyrine or formyl-4-isoantipyrine or 1-phenyl-2,5-dimethyl-4-formyl-3-pyrazolone of the following formula

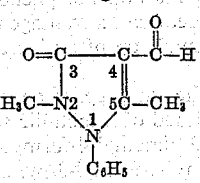

(II)

The formyl-4-antipyrine or 1-phenyl-2,3-dimethyl-4-formyl-5-pyrazolone is a known compound, which may be prepared according to the method described in British Patent 666,578.

The formyl-4-isoantipyrine or 1-phenyl-2,5-dimethyl-4-formyl-3-pyrazolone is also known and may be prepared according to the method described by Ridi and Checchi (Annali di Chimica, vol. 43, 1953, pp. 816–826).

However, for preparing formyl-4-isoantipyrine, applicant prefers to use, the method described by Isoo Ito (J. Pharm. Soc., Japan, vol. 76, 1956, pp. 167–169) for the preparation of formyl-4-antipyrine.

According to the method of Isoo Ito, applicant has prepared the formyl-4-isoantipyrine or 1-phenyl-2,5-dimethyl-4-formyl-3-pyrazolone as follows:

37.4 gr. of 1-phenyl-2,5-dimethyl-3-pyrazolone are mixed with 14.6 gr. of dimethylformamide and the mixture is cooled with a mixture of water and ice at 0° C. 33.75 gr. of $POCl_3$ are then added drop by drop and the mixture is heated on a water bath for 3 hours at 70–80° C. After cooling with ice, the mixture is neutralized with sodium bicarbonate. The mixture is then extracted with five portions of chloroform (750 cc.). The combined chloroform extracts are dried on potassium carbonate and the chloroform is removed by distillation under vacuum. Finally, the residue is crystallized in ethanol. 22.35 gr. of formyl-4-isoantipyrine, M. P. 138–141° C., are obtained.

As for the phenolic acids and for the derivatives of these acids, which likewise occur in the new equimolecular addition compounds according to the present invention, they are constituted by the aromatic carboxylic acids comprising at least one hydroxy or thiophenolic group possibly substituted on the carboxyl function and/or on the phenolic function. Among the substituted derivatives of these acids, one can cite the metallic salts of these acids, the esters of these acids and the amides, possibly substituted of these acids.

In a general manner, the invention therefore concerns, by way of new chemical compounds, the equimolecular addition compounds formed, on the one hand, of a trisubstituted pyrazolone aldehyde selected from a group made up by the 1-phenyl-2,3-dimethyl-4-formyl-5-pyrazolone and the 1-phenyl-2,5-dimethyl-4-formyl-3-pyrazolone and, on the other hand, of a compound selected from the group made up by the aromatic carboxylic acids comprising at least one hydroxy or thiophenolic group and possibly substituted on the carboxyl function and/or on the phenolic function.

According to one feature of the invention, the carboxylic acids of the above named type can have the following general formula:

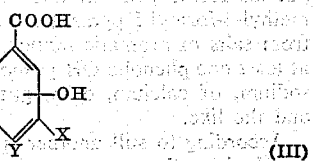

(III)

in which, X, Y and Z, which can be identical or different, designate the hydrogen or a halogen, such as bromine, chlorine or iodine, a nitro group, an alkyl group, such as methyl, ethyl, propyl, isopropyl and analogues, or an oxyalkyl group, such as oxymethyl, oxyethyl and analogues.

Among the aromatic monocarboxylic acids corresponding to the above given Formula III, one can cite salicylic acid and its substituted derivatives, such as 5-iodosalicylic acid, 3-nitrosalicylic acid, 5-bromosalicylic acid, 2-hydroxy-3-methyl-benzoic acid, 3,5-diisopropylsalicylic acid, ortho-vanillic acid and analogues.

The invention concerns, therefore, in particular, the new equimolecular addition compounds formed, on the one hand, from 1-phenyl-2,3-dimethyl-4-formyl-5-pyrazoline and, on the other hand, from a phenolic acid, such as salicylic acid, 5-iodosalicylic acid, 3-nitro salicylic acid, 5-bromo-salicylic acid, 2-hydroxy-3-methylbenzoic acid, 3,5-diisopropyl-salicylic acid, ortho-vanillic acid, as well as other aromatic monocarboxylic acids, bearing a phenolic OH group in the ortho-position and which may be substituted in the other positions by halogens, alkyl groups or oxy-alkyl groups.

Like other monocarboxylic phenolic acids comprising a phenolic hydroxy group, one can also make use of acids, in which the OH group is in the meta or para position and the COOH group possibly in the ortho position. Among these acids, one may cite p-hydroxy benzoic acid, m-hydroxybenzoic acid and thymothymic acid.

Thus the invention likewise concerns, in particular, new equimolecular addition compounds formed, on the one hand, from 1-phenyl-2,3-dimethyl-4-formyl-5-pyrazolone, and on the other hand, from a monocarboxylic acid comprising a phenolic OH group in the meta or in the para, such as p-hydroxybenzoic acid, m-hydroxybenzoic acid and thymothymic acid.

Instead of aromatic monocarboxylic acids comprising a single phenolic hydroxy group in the ortho, meta or para position, one can likewise use aromatic monocarboxylic acids comprising two or three phenolic OH groups, if desired substituted. Among the last mentioned acids, one can cite, by way of examples, beta resorcylic acid, gentisic acid, gallic acid and analogous acids.

The invention therefore also concerns, as new chemical compounds, the equimolecular addition compounds formed, on the one hand, from 1-phenyl-2,3-dimethyl-4-formyl-5-pyrazolone and, on the other hand, from aromatic monocarboxylic acids comprising more than one phenolic OH group substituted if desired, such as betaresorcylic acid, gentisic acid, gallic acid and the like.

According to another particular manner of carrying out the invention, one makes use of salts of hydroxyaromatic carboxylic acids having the following general formula:

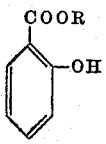

(IV)

in which R designates a metal cation, such as sodium, calcium, zinc, magnesium, lithium and like metals. Just as in the case of aromatic monocarboxylic acids comprising one or several phenolic OH groups, substituents such as halogens, alkyl groups, or oxyalkyl groups, can be provided in the positions not occupied by the COOR group and by the phenolic OH group.

Thus the present invention likewise concerns, as new chemical compounds, the equimolecular addition compounds formed, on the one hand, from 1-phenyl-2,3-dimethyl-4-formyl-5-pyrazolone and, on the other hand, from salts of aromatic monocarboxylic acids comprising at least one phenolic OH group, such as the salicylates of sodium, of calcium, of magnesium, of zinc, of lithium and the like.

According to still another specific manner of carrying out the invention, one makes use in the equimolecular addition compounds of the esters of hydroxyaromatic carboxylic acids, having the following general formula:

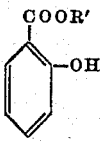

(V)

in which R' designates an alkyl radical, such as methyl, ethyl, propyl and the like.

Thus the invention also concerns the new equimolecular addition compounds formed, on the one hand, from acid esters, such as 1-phenyl-2,3-dimethyl-4-formyl-5-pyrazolone and, on the other hand, from esters of hydroxyaromatic monocarboxylic acids such as methyl salicylate, ethyl salicylate, isoamyl salicylate and the like.

According to a further feature of the invention, one can also use aromatic monocarboxylic acids comprising at least one phenolic hydroxy group, the hydrogen atom of which is substituted by a group chosen from among alkyl radicals, such as methyl, ethyl and the like, aryl radicals, such as phenyl, acyl radicals, such as acetyl, propionyl and the like, and benzoyl and hydroxy-benzoyl radicals.

The invention is, in consequence, concerned equally with new chemical compounds constituted by the equimolecular addition compounds formed, on the one hand, by the 1-phenyl-2,3-dimethyl-4-formyl-5-pyrazolone and, on the other hand, by an aromatic monocarboxylic acid comprising at least one phenolic hydroxy group, the hydrogen atom of which is substituted by a group chosen from among the alkyl, aryl, acyl, benzoyl, carboxyalkyl, and hydroxybenzoyl radicals and the like. As example of an acid of the type specified hereinbefore, one may cite acetylsalicylic acid, propionylsalicylic acid, benzoylsalicylic acid, ortho-carboxymethoxybenzoic acid, salicylsalicylic acid, p-phenetidine salicylate and the like.

Finally, one can, also according to the invention, use in addition to the trisubstituted aldehydic derivative of pyrazolone, the aforesaid aromatic monocarboxylic acid amides of the following general formula:

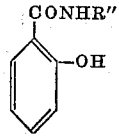

(VI)

in which R'' designates a hydrogen atom or an acyl radical, such as formyl, acetyl, propionyl and the like, or a benzoyl radical, this benzoyl radical bearing if desired at least one phenolic hydroxy group.

Among the aforesaid amides, one may cite, for example, salicylamide, salicylanilide, salicyloylacetamide and the like.

The present invention also deals with a process for the preparation of the equimolecular addition compounds specified above.

The process according to the invention is essentially characterized by the fact that one causes a trisubstituted aldehydic derivative of pyrazolone selected in the group made up of 1-phenyl-2,3-dimethyl-4-formyl-5-pyrazolone and 1-phenyl-2,5-dimethyl-formyl-3-pyrazolone to react on a compound selected from the group made up by aromatic carboxylic acids comprising at least one hydroxy or thiophenolic group and if desired substituted in the carboxyl function and/or on the phenolic function, in the presence of a solvent inert to the reactants.

As solvent inert to the reactants, one can make use, in the process according to the invention, of water or of an organic solvent selected from the group comprising the lower aliphatic alcohols, such as methanol, ethanol, isopropanol and the like, the esters of aliphatic carboxylic acids such as ethyl acetate and the like, liquid aliphatic hydrocarbons, halogenated if desired, such as chloroform, and the aromatic hydrocarbons, such as benzene and toluene.

The reaction between the trisubstituted aldehyde derivative of pyrazolone and the phenolic carboxylic acid or a derivative thereof can advantageously be carried out in an atmosphere made up of an inert gas, such as nitrogen.

In case one wishes to prepare an equimolecular addition compound formed of a metallic salt of salicylic acid and of 1-phenyl-2,3-dimethyl-4-formyl-5-pyrazolone or of 1-phenyl-2,5-dimethyl-4-formyl-3-pyrazolone, one causes a metallic compound, such as sodium bicarbonate, calcium carbonate, zinc carbonate, magnesium carbonate and the like to react in an inert solvent, on the equimolecular salicylic acid addition compound and of one of the said aldehydic derivative of trisubstituted pyrazolones.

Other features and details of the invention will appear in the examples given hereafter, which describe by way of illustration and not of limitation, the preparation of certain of the new equimolecular addition compounds according to the invention.

EXAMPLE 1

138 gr. of salicylic acid are mixed with 216 gr. of formyl-4-antipyrine or 1-phenyl-2,3-dimethyl-4-formyl-5-pyrazolone. One places the mixture of reactants in a round-bottomed flask and one adds thereto 400 cc. of ethyl alcohol. One heats the solution obtained under reflux for 15 minutes, while keeping the reaction mixture in an atmosphere of nitrogen. The solution is filtered hot and the crystals obtained after cooling are drained and washed with 50 cc. of ethyl alcohol. The crude product thus obtained has a melting point of 100–102° C. After three recrystallizations in ethyl alcohol, the product melts at 114–115° C., whilst after one recrystallization in ethyl acetone, it melts at 108–114° C.

The product obtained by the above described process is antipyrine aldehyde salicylate or formyl-4-antipyrine of molecular weight 354 having the following formula:

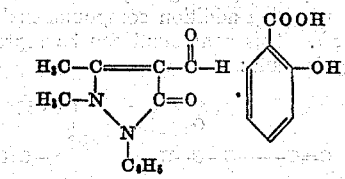

The antipyrine aldehyde salicylate obtained contains 39.07% of salicylic acid. In theory, one obtains 39.60% of this acid. The content of salicylic acid of the antipyrine aldehyde salicylate has been determined by the method described in the Swiss Pharmacopoeia for antipyrine salicylate.

EXAMPLE 2

One has repeated the operational method of Example 1, by starting with 1.38 gr. (1/100 of a mol) of salicylic acid and 2.16 gr. (1/100 of a mol) of antipyrine aldehyde, but by carrying out the reaction in various inert solvents.

The following table mentions the results obtained.

Table I

| Solvents | | Quantities obtained in gr. | M.P., °C. |
|---|---|---|---|
| Name | Quantities used in cc. | | |
| Water | 60 | 1.17 | 114–115 |
| Ethyl acetate | 4 | 3.143 | 104–107 |
| Methyl alcohol | 4 | 3.499 | 104–106 |
| Isopropyl alcohol | 5 | 3.079 | 99–102 |
| Normal butanol | 4 | 3.084 | 97–112 |
| Dioxan | 4 | 2.496 | 96–102 |
| Chloroform | 4 | 2.989 | 95–98 |
| Benzene | 4 | 3.370 | 97–100 |
| Toluene | 4 | 3.431 | 100–106 |

The examination of this table reveals that the organic solvents, such as the lower aliphatic alcohols, produce better quantitative yields, but the product obtained is not very pure. On the other hand, if one works in water as inert solvent, the quantitative yield is lower, but one obtains a very pure product, without it being necessary to recrystallize this product.

In a certain number of trials, one has recrystallized 5 gr. of antipyrine aldehyde salicylate in a certain number of solvents. The results of these recrystallizations are given in the following table:

Table II

| Solvents | Quantities in cc. | Yields | | M.P., °C. |
|---|---|---|---|---|
| | | gr. | Percent | |
| Water | 125 | 3.55 | 71 | 115–116 |
| Methyl alcohol | 5 | 0.668 | 13.36 | 112–114 |
| Ethyl acetate | 5 | 4.719 | 94.38 | 97–98 |
| Toluene | 5 | 4.66 | 93.2 | 89–93 |

This Table II shows that the recrystallization in water gives a high quantitative and qualitative yield.

It is to be noted that with a view to reducing the losses of antipyrine aldehyde salicylate, it can be advantageous to recover the mother liquors of recrystallization for a later preparation of the product.

EXAMPLE 3

One mixes 1 mol of salicylic acid to 1 mol of formyl-4-antipyrine. One adds to this mixture 500 cc. of a mixture of equal parts by volume of methanol and ethanol. This mixture is dissolved cold. After adding 1 litre of water, one obtains a precipitate, which is filtered and drained. The addition compound, obtained with a 70% yield, melts at 114–116° C.

EXAMPLE 4

2.16 gr. of 1-phenyl-2,5-dimethyl-4-formyl-3-pyrazolone and 1.38 gr. of salicylic acid are mixed with 3 cc. of ethyl alcohol. The mixture obtained is heated under reflux for ¼ hour. After cooling and filtration, one obtains 2.2 gr. (yield: 62%) formyl-4-isoantipyrine salicylate melting at 99–100° C.

Said salicylate has the following formula:

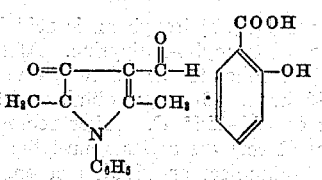

EXAMPLE 5

1.54 gr. (1/100 of a mol) of thiosalicylic acid are mixed with 2.16 gr. (1/100 of a mol) of formyl-4-antipyrine. The mixture obtained is heated under reflux in 3 cc. of alcohol. After cooling, one obtains crystals, which one separates and which one drains. The dried crystals, which met at 139–146° C., weigh 1.81 gr.

The antipyrine aldehyde thiosalicylate has the following formula:

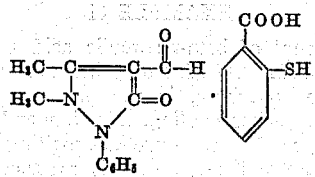

EXAMPLE 6

1/100 of a mol of formyl-4-antipyrine or 1-phenyl-2,3-dimethyl-4-formyl-5-pyrazolone is mixed with 1/100 of a mol of meta-hydroxybenzoic acid. To the mixture thus obtained, one adds 2 cc. of ethyl alcohol and one heats on the reflux. After cooling, one adds water. There thus forms a precipitate which one drains. The meta-hydroxybenzoate of formyl-4-antipyrine obtained melts at 109–112° C. and has the following formula:

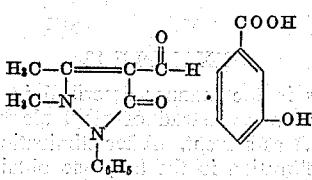

EXAMPLE 7

One dissolves 1.64 gr. (1/100 of a mol) of p-hydroxycinnamic acid and 2.16 gr. (1/100 of a mol) of formyl-4-antipyrine in 3 cc. of ethanol. One heats on the reflux for ¼ hour on the water-bath. One allows to cool and one drains the crystals formed. M.P.: 133–138° C.

One obtains by this process an addition compound of p-hydroxycinnamic acid and of 1-phenyl-2,3-dimethyl-4-formyl-5-pyrazolone, of the formula:

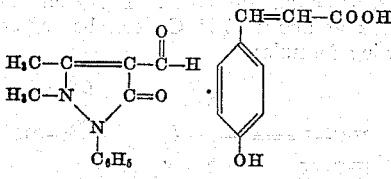

EXAMPLE 8

1/100 of a mol of formyl-4-antipyrine is mixed with 1/100 of a mol of meta-hydroxybenzoic acid. To the mixture thus obtained, one adds 30 cc. of water, then one decants and one heats the reaction mixture on reflux. After cooling, one drains the crystals of meta-hydroxybenzoate of formyl-4-antipyrine melting at 113–114° C.

EXAMPLE 9

To a mixture of 1/100 of a mol of formyl-4-antipyrine and 1/100 of a mol of meta-hydroxybenzoic acid, one adds 2 cc. of ethyl aetate. One heats the reaction mixture on the reflux and, after cooling, one adds water. There then form crystals of meta-hydroxybenzoate of formyl-4-antipyrine which one drains and which melt at 110–112° C.

EXAMPLE 10

1/100 of a mol of p-hydroxybenzoic acid is mixed with 1/100 of a mol of formyl-4-antipyrine. After addition of 4 cc. of ethyl alcohol to the mixture, one heats on the reflux, for 1/4 hour. One thus obtains 2.71 gr. of crystals melting at 154–156° C. After recrystallization in ethyl alcohol (2 cc.) the crystals have the same melting point. The equimolecular addition compound of p-hydroxy benzoic acid-formyl-4-antipyrine has the following formula:

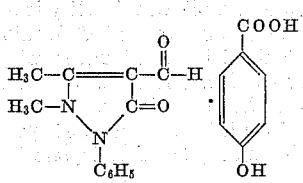

EXAMPLE 11

1/100 of a mol of beta-resorcylic acid and 1/100 of a mol of the aldehyde of antipyrine are heated under reflux on the waterbath, in the presence of 5 cc. of ethyl alcohol. After cooling, filtration and drying, one obtains 3.03 gr. of a crude product melting at 149–150° C. After recrystallization of this product in absolute alcohol, it melts at 152–162° C. The product constituted by an equimolecular addition compound of beta-resorcylic acid and of formyl-4-antipyrine can be represented by the following formula:

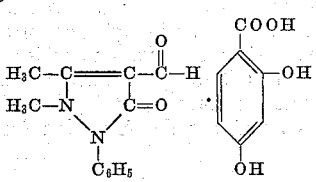

EXAMPLE 12

One works in the manner described in Example 11, excepting that only instead of ethyl alcohol, one uses water (30 cc.) as solvent. After elimination of the oily particles by filtration in the hot, one obtains a product melting at 159–162° C.

EXAMPLE 13

2.16 gr. (1/100 of a mol) of 1-phenyl-2,3-dimethyl-4-formyl-5-pyrazolone are dissolved in a few cubic centimetres of hot ethyl alcohol. To this solution, one adds a solution containing 1.54 gr. (1/100 of a mol) of gentisic acid in 4 cc. of ethyl alcohol. One keeps the mixture gently boiling for some minutes and one allows it to cool. One thus obtains a crystalline precipitate (2.8 gr.=75%) which is recrystallized in water. The product obtained, which melts at about 178° C., can be represented by the following formula:

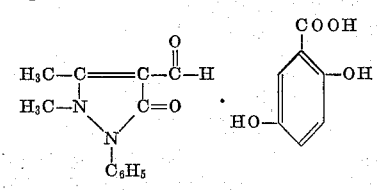

EXAMPLE 14

2.16 gr. (1/100 of a mol) of 1-phenyl-2,5-dimethyl-4-formyl-3-pyrazolone and 1.54 gr. of gentisic acid are heated under reflux in 15 cc. of ethyl alcohol. After filtering and cooling, the solution is stored in a refrigerator, whereby crystals (2.12 gr.—yield: 52.7%) are obtained. The resulting addition compound melts at 165–167° C. (dec.). This compound can be represented by the following formula:

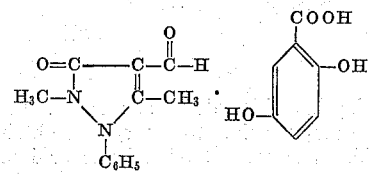

EXAMPLE 15

1.70 gr. of gallic acid and 2.16 gr. of antipyrine aldehyde are heated under reflux in 4 cc. of alcohol. After a quarter of an hour of heating, one allows the reaction mixture to cool and one filters and drains the precipitated crystals. One thus obtains 1.56 gr. of crude gallate of formyl-4-antipyrine melting at 174–175° C. After recrystallization in 2 cc. of ethyl alcohol, this product melts at 177–180° C. It has the following formula:

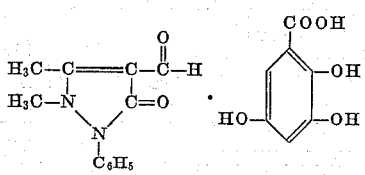

EXAMPLE 16

One mixes 1/100 of a mol of 3-nitrosalicylic acid to 1/100 of a mol of formyl-4-antipyrine or 1-phenyl-2,3-dimethyl-4-formyl-5-pyrazolone. One adds to this mixture 2 cc. of ethanol and one heats on the reflux. After cooling, one drains the crystals obtained which melt at 118–130° C.

The addition compound prepared by this process can be represented by the following formula:

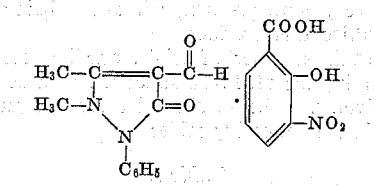

EXAMPLE 17

One works as in Example 16, save only that instead of ethanol one uses methanol. The crystals obtained melt at 94–101° C.

EXAMPLE 18

One works as in Example 16, save only that one makes use of benzene instead of ethanol. The crystals obtained melt at 73–81° C.

EXAMPLE 19

To a mixture of 1/100 of a mol of 3-nitrosalicylic acid and 1/100 of a mol of formyl-4-antipyrine, one adds 40 cc. of water and one heats on the reflux. One filters hot and, after cooling, one drains the crystals obtained. These melt at 105–110° C.

EXAMPLE 20

One mixes 1/100 of a mol of 5-bromosalicylic acid with 1/100 of a mol of formyl-4-antipyrine. After addition of 20 cc. of water, two phases form. One decants the upper phase and allows to crystallize. There thus form crystals melting at 96–103° C.

The compound obtained can be represented by the following formula:

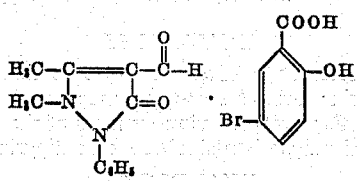

EXAMPLE 21

One mixes 1/100 of a mol of 5-bromosalicylic acid with 1/100 of a mol of formyl-4-antipyrine. One adds to this mixture 2 cc. of benzene and one heats on the reflux. A dissolution is produced, which is followed by a solidification of the mass. One adds 2 cc. more of benzene, this addition does not produce redissolution. One drains the crystals obtained. These crystals melt at 97–107° C.

EXAMPLE 22

To a mixture of 1/100 of a mol of 5-bromosalicylic acid and 1/100 of a mol of formyl-4-antipyrine, one adds 2 cc. of dioxan. One heats the reaction mixture on the reflux and, after cooling, one drains the crystals obtained, which melt at 103–106° C.

EXAMPLE 23

2.16 gr. of 1-phenyl-2,5-dimethyl-4-formyl-3-pyrazolone and 2.17 gr. of 5-bromosalicylic acid are mixed with 3 cc. of ethyl alcohol and the resulting mixture is heated under reflux during ¼ hour. After cooling in a refrigerator, the crystals are filtered, dried and washed with a small amount of cold alcohol. 2.68 gr. (yield: 61.8%) of crystals melting at 94–95° C. are obtained.

The addition compound can be represented by the following formula:

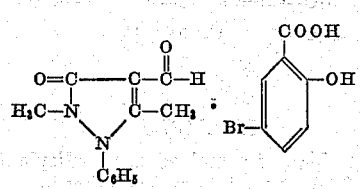

EXAMPLE 24

2.64 gr. (1/100 of a mol) of 5-iodosalicylic acid are mixed with 2.16 gr. (1/100 of a mol) of antipyrine aldehyde. One adds 3 cc. of ethyl alcohol to the mixture, in a manner so as to obtain a solution which one heats for ¼ hour under reflux on a water-bath. After cooling, the crystals obtained are drained. Thus one obtains 0.928 gr. of 5-iodosalicylate of formyl-4-antipyrine melting at 145–154° C. This product corresponds to the following formula:

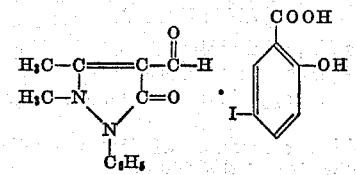

EXAMPLE 25

One dissolves 1.52 gr. (1/100 of a mol) of 2-hydroxy-3-methylbenzoic acid in 3 cc. of ethyl alcohol containing 2.16 gr. (1/100 of a mol) of 1-phenyl-2,3-dimethyl-4-aldehyde-5-pyrazolone. One heats the reaction solution on the reflux for ¼ hour, one lets it cool and one filters the crystals obtained. These crystals melt at 142–147° C.

The product obtained is constituted by the equimolecular addition compound of hydroxy-3-methylbenzoic acid and formyl-4-antipyrine, illustrated by the following formula:

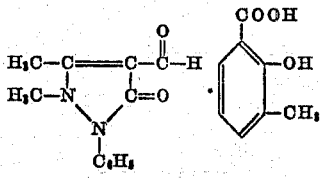

EXAMPLE 26

2.22 gr. (1/100 of a mol) of 3,5-diisopropyl-salicyclic acid are mixed with 2.16 gr. (1/100 of a mol) of antipyrine aldehyde. After addition of 4 cc. of ethyl alcohol, one heats under reflux on the water-bath for ¼ hour. One allows the reaction mixture to cool, after which one filters and one drains the crystals obtained. One thus obtains 0.763 gr. of 3,5-diisopropylsalicylate of 1-phenyl-2,3-dimethyl-4-aldehyde-5-pyrazolone melting at 134–142° C.

The equimolecular addition compound obtained by this process can be represented by the following formula:

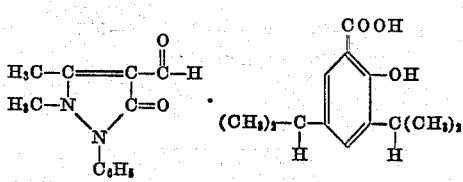

EXAMPLE 27

One mixes 1/100 of a mol of thymothymic acid with 1/100 of a mol of formyl-4-antipyrine. After addition of 1 cc. of ethanol, one heats with reflux. By cooling, crystals form which one drains. M.P. 87–89° C.

The addition compound obtained can be represented by the following formula:

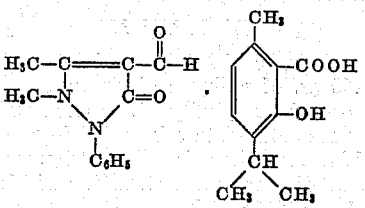

EXAMPLE 28

A 1.68 gr. of orthovanillic acid and 2.16 gr. of antipyrine aldehyde are heated under reflux in the presence of 4 cc. of ethyl alcohol. After cooling, one separates and one drains the crystals obtained on a Büchner filter. One obtains thus 2.336 gr. of orthovanillate of formyl-4-antipyrine melting at 122–126° C.

This product can be represented by the following formula:

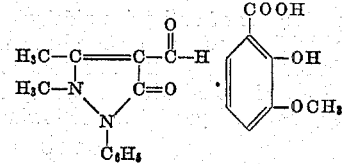

EXAMPLE 29

1/100 of a mol (2.52 gr.) of sulphosalicylic acid is mixed with 1/100 of a mol (2.16 gr.) of antipyrine aldehyde and with 1/100 of a mol of sodium bicarbonate. One heats the mixture in the presence of ethyl alcohol. When the liberation of carbon dioxide has ceased one heats under reflux for ¼ hour, after which one allows the reaction mixture to cool and one filters and drains the crystals obtained. One obtains 1.43 gr. of an equimolecular addition compound melting at 145–150° C. and which can be represented by the following formula:

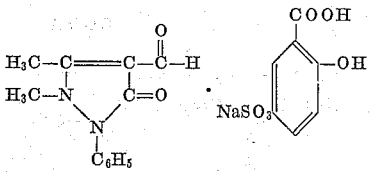

EXAMPLE 30

1/100 of a mol of sodium salicylate and 1/100 of a mol of antipyrine aldehyde are dissolved by heating under reflux in 4 cc. of ethyl alcohol. By cooling, one obtains crystals which one separates and which one drains. The yield reaches 1.735 gr. of the addition compound sodium salicylate-aldehyde of antipyrine melting at 150–153° C. One redissolves the crystals in 5 cc. of absolute alcohol, one filters hot and one recrystallizes. The crystals obtained show the same melting point.

The compound obtained by this process can be represented by the following formula:

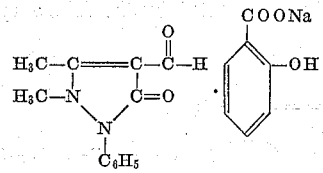

EXAMPLE 31

One dissolves 1/100 of a mol (3.54 gr.) of salicylate of antipyrine aldehyde obtained by the operational method described in Example 1 and 1/100 of a mol of sodium bicarbonate in a small quantity of ethyl alcohol. After heating with reflux of the reaction mixture and cooling, one obtains crystals, which are separated by filtration, drained and recrystallized in absolute alcohol.

The product obtained by this operational method is the same as that of Example 30.

EXAMPLE 32

2.16 gr. of 1-phenyl-2,5-dimethyl-4-formyl-3-pyrazolone and 1.60 gr. of sodium salicylate are heated under reflux with 4 cc. of ethyl alcohol. After heating during 1/4 hour, the reaction mixture is cooled in a refrigerator. The crystalline precipitate is dried and washed with a small amount of cold ethyl alcohol. Yield: 2.54 gr. (67.5%), M.P. 148–150° C.

The addition compound can be represented by the following formula:

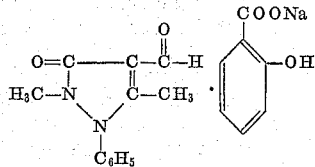

EXAMPLE 33

3.54 gr. of salicylate of antipyrine aldehyde are mixed with 0.5 gr. of calcium carbonate. One heats the mixture under reflux in the presence of 2 cc. of ethanol. By cooling, crystals form of the addition compound of calcium salicylate-antipyrine aldehyde of the following formula:

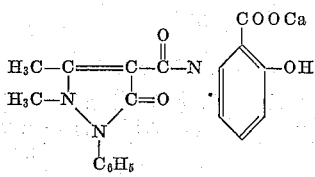

EXAMPLE 34

1/100 of a mol of 1-phenyl-2,3-dimethyl-4-formyl-5-pyrazolone salicylate is mixed with 1/200 of a mol of zinc carbonate. The mixture is heated under reflux in 2 cc. of ethanol. By cooling, one obtains a pasty mass of the addition compound salicylate of zinc of antipyrine aldehyde.

EXAMPLE 35

One operates as in Example 34, excepting only that instead of zinc carbonate one uses magnesium carbonate. By cooling, there forms a vitreous mass of the compound salicylate of magnesium-aldehyde of antipyrine.

EXAMPLE 36

One mixes 1/100 of a mol of formyl-4-antipyrine with 1/100 of a mol of lithium salicylate. After addition of 5 cc. of water, one heats under reflux. By cooling of the reaction mixture crystals form of an addition compound of lithium salicylate and formyl-4-antipyrine melting at 96–99° C.

The compound obtained by this process can be represented by the following formula:

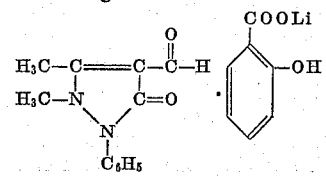

EXAMPLE 37

1/100 of a mol of methyl salicylate is added to 1/100 of a mol of formyl-4-antipyrine. The mixture is heated in the presence of a solvent on the boiling water-bath. By cooling, one obtains crystals, which are filtered and drained. The yield reaches 1.234 gr. of crystals melting at 125–128° C. The addition compound methyl salicylate-antipyrine aldehyde obtained by this process has the following formula:

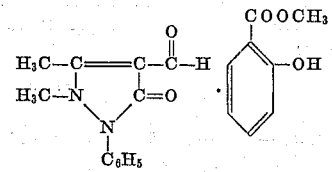

EXAMPLE 38

One mixes 1/100 of a mol of ethyl salicylate with 1/100 of a mol (2.16 gr.) of formyl-4-antipyrine. One heats this mixture up to complete dissolution, then one cools, which causes the solidification of the addition compound ethyl salicylate and formyl-4-antipyrine, of the formula:

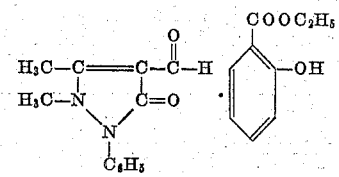

This addition compound melts at about 157° C.

EXAMPLE 39

One heats 1/100 of a mol of formyl-4-antipyrine in the presence of 1/100 of a mol of isoamyl salicylate. The reaction mixture changes into a solution and solidifies by cooling.

The addition compound of isoamyl salicylate and formyl-4-antipyrine of the formula:

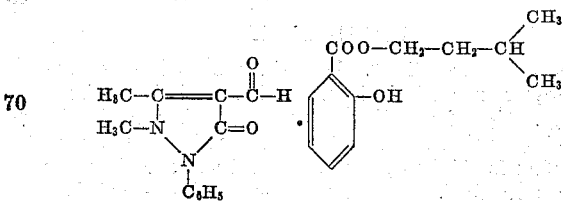

melts at 137–139° C.

EXAMPLE 40

2.16 gr. of formyl-4-isoantipyrine or 1-phenyl-2,5-dimethyl-4-formyl-3-pyrazolone and 2.08 gr. of isoamyl salicylate are mixed with 2 cc. of ethyl alcohol. The mixture is then heated under reflux during ¼ hour, cooled and placed in a refrigerator. The crystals are filtered. Yield: 1.88 gr. (44.3%), M.P. 143–145° C.

EXAMPLE 41

1.80 gr. of acetylsalicylic acid and 2.16 gr. of antipyrine aldehyde are dissolved in 10 cc. of acetone. After heating under reflux for 10 minutes, one allows to cool. Crystals thus form, which one separates, and which one drains.

These crystals of acetylsalicylate of 1-phenyl-2,3-dimethyl-4-formyl-5-pyrazolone of the formula:

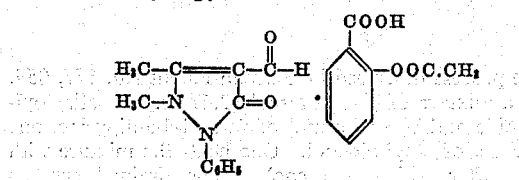

melt at 132–134° C.

EXAMPLE 42

One operates as in Example 41, using 10 cc. of ethanol instead of acetone.

EXAMPLE 43

One operates as in Example 41, but using 10 cc. of chloroform instead of acetone.

EXAMPLE 44

One operates as in Example 41, but using 10 cc. of ethyl acetate instead of acetone.

EXAMPLE 45

2.16 gr. of 1-phenyl-2,5-dimethyl-4-formyl-3-pyrazolone and 1.80 gr. of acetylsalicylic acid are heated under reflux for 15 minutes in the presence of 2 cc. of ethyl alcohol. After cooling in a refrigerator and filtration, the crystals are dried and washed with a small amount of cold ethyl alcohol. Yield: 2.02 gr. (52.7%), M.P. 86–88° C.

The addition compound can be represented by the following formula:

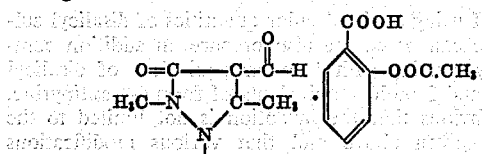

EXAMPLE 46

To 1/100 of a mol of propionylsalicylic acid, one mixes 1/100 of a mol of formyl-4-antipyrine. One adds to this mixture 3 cc. of ethanol and one heats with reflux. After cooling, one drains the crystals formed. M.P. 149–151° C.

The addition compound of propionylsalicylic acid and formyl-4-antipyrine, can be represented by the following formula:

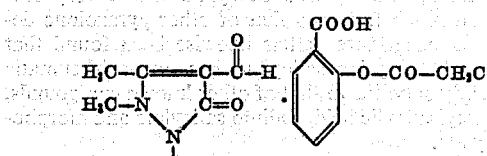

EXAMPLE 47

To a mixture of 1/100 of a mol (1.95 gr.) of orthocarboxymethoxy-benzoic acid and 1/100 of a mol of formyl-4-antipyrine, one adds 5 cc. of water, after which one heats the reaction mixture with reflux. By cooling, crystals form which one drains. M.P. 100–102° C.

The addition compound of ortho-carboxymethoxybenzoic acid and formyl-4-antipyrine can be represented by the following formula:

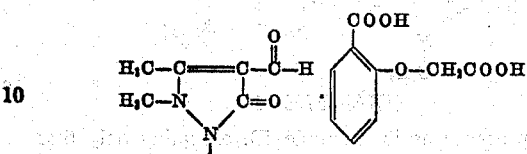

EXAMPLE 48

One operates as in Example 47, excepting only that instead of 5 cc. of water, one uses 2 cc. of ethanol.

EXAMPLE 49

One operates as in Example 47, excepting only that instead of 5 cc. of water, one uses 4 cc. of dioxane.

EXAMPLE 50

To a mixture of 1/100 of a mole of ortho-carboxymethoxybenzoic acid and 1/100 of a mol of formyl-4-antipyrine, one adds 10 cc. of benzene. Two phases form. After decantation of the upper phase and heating under reflux, one cools the reaction mixture and drains the crystals formed. In order to purify them, these crystals are taken up again in 5 cc. of dioxan. After heating with reflux and cooling, one obtains crystals melting at 95–115° C.

EXAMPLE 51

1.52 gr. of anisic acid are dissolved in 3 cc. of ethyl alcohol. One adds to the solution 2.16 gr. of 1-phenyl-2,3-dimethyl-4-formyl-5-pyrazolone. After heating with reflux for a quarter of an hour on the water-bath, one allows to cool and one filters the crystals obtained. After draining of the crystals (2.77 gr.), the latter melt at 118–119° C. One recrystallizes in alcohol (3 cc.) and the crystals then melt at 119–127° C.

The addition compound anisic acid-antipyrine aldehyde thus obtained has the formula:

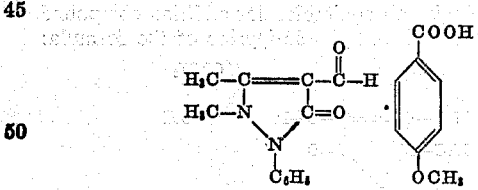

EXAMPLE 52

One mixes 1/100 of a mol (2.04 gr.) of benzoylsalicylic acid with 1/100 of a mol of 1-phenyl-2,3-dimethyl-4-formyl-5-pyrazolone. One heats the mixture with reflux in the presence of 2 cc. of ethanol. One places in a refrigerator and ones drains the crystals formed. M.P. 89–91° C.

The addition compound of benzoyl salicylic acid and formyl-4-antipyrine can be represented by the following formula:

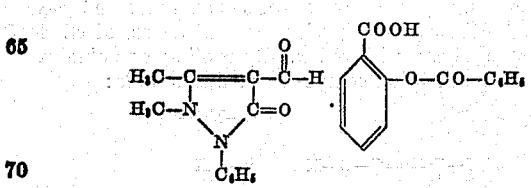

EXAMPLE 53

To a mixture of 1/100 of a mol of salicylsalicylic acid and 1/100 of a mol of formyl-4-antipyrine, one adds 2 cc.

of isopropanol. One heats with reflux. By cooling, one obtains crystals which are drained. M.P. 105–106° C.

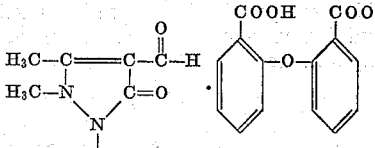

EXAMPLE 54

One proceeds as in Example 53, excepting only that instead of 2 cc. of isopropanol, one employs 5 cc. of ethanol. The crystals obtained also melt at 105–106° C.

EXAMPLE 55

One prepares the salicylacetate of p-phenetidine, of the formula:

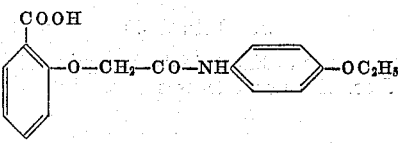

by the process described in Riedel's German Patent No. 98,707.

To $\frac{1}{100}$ of a mol (3.09 gr.) of the salicylacetate of p-phenetidine, one mixes $\frac{1}{100}$ of a mol of formyl-4-antipyrine. One dissolves the mixture in 5.5 cc. of ethanol and one heats with reflux. After cooling, one drains the crystals formed, which melt at 123–133° C. To purify these crystals, one dissolves them in 6 cc. of boiling ethanol. One filters hot and one allows to crystallize. The purified crystals melt at 129–131° C.

EXAMPLE 56

1.37 gr. ($\frac{1}{100}$ of a mol) of salicylamide and 2.16 gr. ($\frac{1}{100}$ of a mol) of antipyrine aldehyde are dissolved by boiling in 20 cc. of water. After heating of the solution for some ten minutes, one allows the mixture to cool and one thus obtains a crystalline precipitate. The dried crystals (1.99 gr.) melt at about 138° C. A portion of the crude product is recrystallized in water and melts at 135–139° C., whilst another part of this product is recrystallized in alcohol and melts at 134–138° C.

One thus obtains an equimolecular addition compound of salicylamide and formyl-4-antipyrine of the formula:

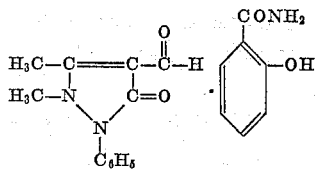

EXAMPLE 57

2.16 gr. of 1-phenyl-2,5-dimethyl-4-formyl-3-pyrazolone and 1.37 gr. of salicylamide are heated under reflux for 15 minutes in the presence of 10 cc. of water. After cooling and starting in a refrigerator, the crystals are dried and washed with a small amount of ice water. Yield: 1.27 gr. (35.9%), M.P. 108–110° C.

EXAMPLE 58

To a mixture of $\frac{1}{100}$ of a mol of salicylanilide and $\frac{1}{100}$ of a mol of formyl-4-antipyrine, one adds 2 cc. of ethyl alcohol. One heats with reflux. By cooling, one obtains crystals of the addition compound of the formula:

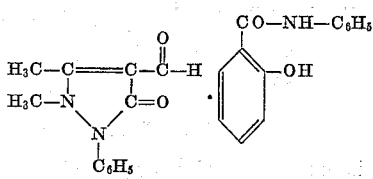

which melt at 85–99° C.

EXAMPLE 59

One operates as in Example 58 excepting only that one uses methyl alcohol instead of ethyl alcohol. The crystals obtained melt at 90–105° C.

EXAMPLE 60

One operates as in Example 58, excepting only that one uses benzene instead of ethanol. One obtains crystals melting at 82–91° C.

EXAMPLE 61

One prepares salicyloylacetamide of the formula:

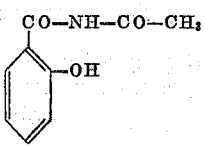

by the process described in German Patent No. 177, 054.

To a mixture of $\frac{1}{100}$ of a mol (2.67 gr.) of salicyloylacetamide and $\frac{1}{100}$ of a mol of formyl-4-antipyrine, one adds 5 cc. of ethyl alcohol. One heats the mixture with reflux, after which one cools. The drained crystals formed melt at 101–111° C. By recrystallization in 4 cc. of ethyl alcohol, one obtains crystals melting at 104–106° C.

EXAMPLE 62

One mixes $\frac{1}{100}$ of a mol (3.06 gr.) of disalicyl sulphide prepared according to Klausa, Zeit. Natur. 76, 415 (1952), with $\frac{1}{100}$ of a mol of formyl-4-antipyrine. To this mixture, one adds 20 cc. of ethyl alcohol. After cooling, the crystals obtained are drained. M.P. 200–202° C.

The addition compound of disalicyl sulphide and formyl-4-antipyrine can be represented by the following formula:

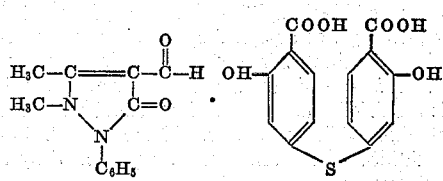

Instead of using equimolecular quantities of disalicyl sulphide one can of course also prepare an addition compound by starting with 1 molar equivalent of disalicyl sulphide and 2 molar equivalents of formyl-4-antipyrine.

It is obvious that the invention is not limited to the examples given above and that various modifications can be applied to it both with regard to the nature of the reactants as well as to reaction conditions, without departing from the scope of the invention, as it is defined in the claims concluding the present memorandum.

The new equimolecular addition compounds according to the invention are employable in the therapeutic field.

Among the new compounds, the salicylic acid-antipyrine aldehyde addition compound has already been the object of extensive pharmacological examinations.

These examinations have made it possible to determine that the formyl-4-antipyrine salicylate has a very low toxicity and much less than that of other pyrazolone derivatives. Furthermore, it has likewise been found that the formyl-4-antipyrine salicylate has an antirheumatic action clearly superior to that of other known compounds, such as acetylsalicylic acid, sodium salicylate and morpholine salicylate.

As to the analgesic power of the aldehyde salicylate, it has proved superior to that developed by known commercial products, such as Irgapyrine (phenylbutazone+pyramidon), pyramidon (N-dimethyl amino-antipyrine) and Novalgine (sodium methylaminomethane sulphonate of phenyldimethyl-pyrazolone).

Finally, the antipyrine aldehyde salicylate produces a marked inhibition of the hyperthermia provoked by Delbet's polyvalent vaccine. Furthermore, a comparative examination of the hyperthermic action of the antipyrine salicylate and of the antipyrine aldehyde salicylate has made it possible to arrive at the following conclusions:

(1) The antipyrine salicylate inhibits in a much less marked manner the hyperthermia reaction provoked by Delbet's vaccine.

(2) At an appropriate dose (250 mg./10 kg. of weight of the animal), the antipyrine aldehyde salicylate completely prevents all postvaccinal hyperthermic manifestation.

The pharmacological examination of another equimolecular addition compound according to the invention, to wit formyl-4-antipyrine acetyl-salicylate, has shown that this compound also shows an appreciable hyperthermic action.

What I claim is:

1. A compound of the following formula

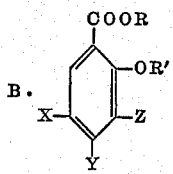

wherein B is a member selected from the group consisting of 1-phenyl-2,3-dimethyl-4-formyl-5-pyrazolone and 1-phenyl-2,5-dimethyl-4-formyl-3-pyrazolone; R is a member selected from the group consisting of hydrogen, an alkali metal, an alkaline earth metal, zinc, and an alkyl group having from 1 to 5 carbon atoms; R' is a member selected from the group consisting of hydrogen, a lower alkyl group, an alkanoyl radical having from two to three carbon atoms, and a salicyl radical; and X, Y and Z are members selected from the group consisting of hydrogen, a halogen and a lower alkyl radical.

2. A compound of the following formula

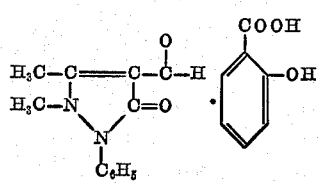

3. A compound of the formula

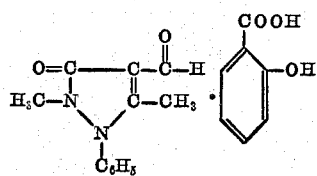

4. A compound of the formula

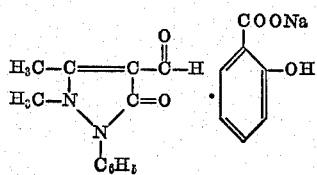

5. A compound of the formula

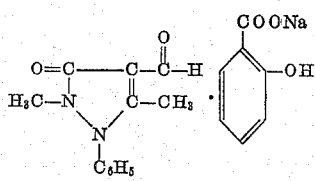

6. A compound of the formula

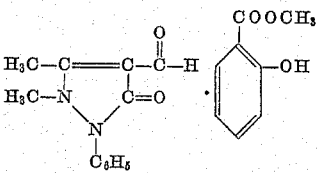

7. A compound of the formula

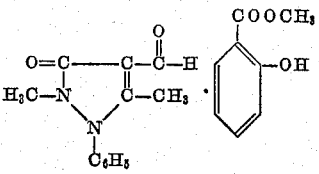

8. A compound of the formula

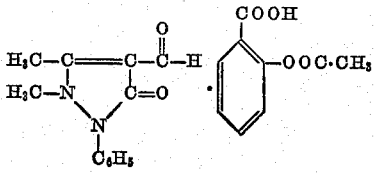

9. A compound of the formula

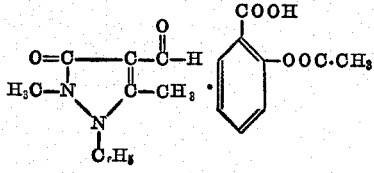

10. A compound of the formula

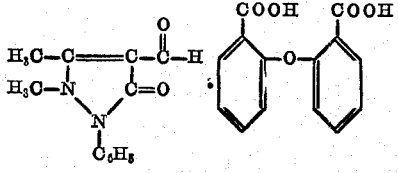

11. A compound of the formula

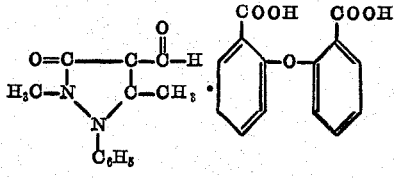

References Cited in the file of this patent
UNITED STATES PATENTS
2,323,193    Boie et al. _____ June 29, 1943

OTHER REFERENCES

Amal., Chem. Abstracts, vol. 44, col. 6853-4 (1950).